US007421322B1

(12) United States Patent
Silversmith et al.

(10) Patent No.: US 7,421,322 B1
(45) Date of Patent: Sep. 2, 2008

(54) SYSTEM AND METHOD FOR AUTOMATIC IDENTIFICATION OF VEHICLE IDENTIFICATION NUMBER

(75) Inventors: David L. Silversmith, Burke, VA (US); Renan Ayrault, Washington, DC (US)

(73) Assignee: Carfax, Inc., Fairfax, VA (US)

( * ) Notice: Subject to any disclaimer, the term of this patent is extended or adjusted under 35 U.S.C. 154(b) by 96 days.

(21) Appl. No.: 11/118,775

(22) Filed: May 2, 2005

Related U.S. Application Data

(60) Provisional application No. 60/566,442, filed on Apr. 30, 2004.

(51) Int. Cl.
*G06F 17/00* (2006.01)
(52) U.S. Cl. ............................................. 701/35; 705/1
(58) Field of Classification Search ............ 701/1, 701/29, 33, 35, 32; 707/104.1, 200; 307/10.5; 709/217; 705/1
See application file for complete search history.

(56) References Cited

U.S. PATENT DOCUMENTS

| 4,404,639 | A | * | 9/1983 | McGuire et al. ............. 701/35 |
| 5,826,258 | A | | 10/1998 | Gupta et al. |
| 5,842,205 | A | | 11/1998 | Brann |
| 5,844,987 | A | * | 12/1998 | Matthews et al. ........... 340/901 |
| 5,963,949 | A | | 10/1999 | Gupta et al. |
| 6,263,322 | B1 | * | 7/2001 | Kirkevold et al. ........... 705/400 |
| 6,304,870 | B1 | | 10/2001 | Kushmerick et al. |
| 6,609,108 | B1 | | 8/2003 | Pulliam et al. |
| 6,643,641 | B1 | | 11/2003 | Snyder |
| 6,714,933 | B2 | | 3/2004 | Musgrove et al. |
| 6,754,564 | B2 | * | 6/2004 | Newport ....................... 701/1 |
| 6,785,671 | B1 | | 8/2004 | Bailey et al. |
| 6,834,048 | B1 | | 12/2004 | Cho et al. |
| 2001/0011221 | A1 | * | 8/2001 | Underwood ................... 705/1 |
| 2002/0065844 | A1 | | 5/2002 | Robinson et al. |
| 2002/0072808 | A1 | * | 6/2002 | Li .................................. 700/5 |
| 2002/0091706 | A1 | * | 7/2002 | Anderson et al. ........ 707/104.1 |
| 2002/0107882 | A1 | | 8/2002 | Gorelick et al. |
| 2003/0167209 | A1 | | 9/2003 | Hsieh |
| 2004/0199430 | A1 | | 10/2004 | Hsieh |
| 2005/0050031 | A1 | | 3/2005 | Matsumoto |

FOREIGN PATENT DOCUMENTS

JP          2003-30235          1/2003

OTHER PUBLICATIONS

Chrome Inventory Search™, "Match Vehicles They Want to the Vehicle on Your Lot", Chrome Driving Automative Commerce™, www.chrome.com, 2 pgs.
"Target-Based Document-Independent Information Extraction", David W. Embley et al., Brigham Young University, www.deg.byu.edu, 11 pgs.
"A Hierarchical Approach to Wrapper Induction", Ion Muslea et al., University of Southern California, {muslea, minton, knoblock}@isi.edu, 8 pgs.
"Building a Web-Based Search Tool", Andrew Peterson, Updated: Jul. 19, 2001, Article from SQL Server Magazine, 8 pgs.

* cited by examiner

*Primary Examiner*—Dalena Tran
(74) *Attorney, Agent, or Firm*—Marc S. Kaufman; Nixon Peabody, LLP

(57) ABSTRACT

A vehicle history information system is provided for obtaining vehicle history information associated with a vehicle identification number (VIN). The vehicle history information system includes a VIN identification module adapted to identify at least one VIN in an electronic file, a database having vehicle history records relating to vehicle history of one or more vehicles, and a vehicle history report module adapted to retrieve vehicle history records associated the VIN identified. A method and a computer readable storage medium having instructions for obtaining vehicle history information are also provided.

48 Claims, 3 Drawing Sheets

SYSTEM AND METHOD FOR AUTOMATIC IDENTIFICATION OF VEHICLE IDENTIFICATION NUMBER

This application claims priority to U.S. Provisional Application No. 60/566,442, filed Apr. 30, 2004, the contents of which are incorporated herein by reference.

BACKGROUND OF THE INVENTION

1. Field of the Invention

The present invention is directed to a system and method for automatically identifying a vehicle identification number (VIN) in an electronically displayable file or document, and retrieving information regarding the vehicle's history using the identified VIN.

2. Description of the Related Art

Consumers and automotive professionals involved in the trading of used vehicles recognize the importance of information relating to a used vehicle's history in making a purchasing decision, including placing a value on a particular vehicle. Consequently, services have been created that function primarily to provide vehicle history information to various parties in the used vehicle market, including dealers and individual consumers.

For example, web site www.carfax.com™ operated by CARFAX, Inc., permits a potential buyer of a vehicle to purchase a vehicle history report containing an extensive collection of vehicle history information on a particular vehicle. The vehicle history report may include such vehicle history information as model year, odometer readings, ownership records, accident information, the existence of salvage and/or flood titles and maintenance records. This information is presented as a series of vehicles history records in a vehicle history report.

Since 1981, most vehicles built around the world have been issued a unique identification number known as a Vehicle Identification Number or VIN. VINs include seventeen (17) characters in 17 sequential positions from left to right. The structure of a VIN's 17 characters, which includes numbers and letters, except the letters I, O, and Q, is strictly and universally codified. The positions of the seventeen characters are referred to and explained below from left to right:

Position 1 represents the country of origin (i.e., 1=United States; J=Japan)
Position 2 identifies the manufacturer (i.e., G=GM; B=BMW; N=Nissan)
Position 3 identifies the make or division
Positions 4-8 are the unique attributes which include the engine transmission, restraints, steering etc. which designate the "model" of the vehicle
Position 9 is the Check digit and is a number between 0 and 9.
Position 10 identifies the model year (i.e., A=1980, B=1981; Y=2000; 1=2001; etc)
Position 11 identifies the assembly plant
Positions 12-17 are sequential production numbers—their structure is left to the manufacturer's discretion For example, the VIN 1FALP4047TF208886 would be partially "decoded" to read:

| | |
|---|---|
| Manufactured in: | UNITED STATES |
| Make/Model/Year: | FORD MUSTANG 1996 |
| Body Style: | COUPE |
| Engine: | 3.8L V6 SFI |
| Fuel: | GASOLINE |
| Driveline: | REAR WHEEL DRIVE |

Similarly the VIN 2G4WB52K1W1485967 would be partially "decoded" to read:

| | |
|---|---|
| Manufactured in: | CANADA |
| Make/Model/Year: | BUICK REGAL LS 1998 |
| Body Style: | SEDAN 4 DR |
| Engine: | 3.8L V6 SFI 12V |
| Fuel: | GASOLINE |
| Driveline: | FRONT WHEEL DRIVE |

VINs are widely used throughout the automotive industry to identify vehicles. In particular, VINs serve as codes/keys in many databases containing vehicle information, to designate the respective vehicles. For instance, VINs are used in the following areas:

By automobile dealers in specialized enterprise software, known as Dealership Management Systems (DMS), which assists dealers in managing their business by storing and handling many complex tasks involved in running a dealership, including keeping track of their vehicle inventory by VINs By vehicle history information and data providers, such as a database owned by CARFAX, Inc., where a vehicle's history records (accidents, number of owners, service and repair information, etc.) are stored and indexed using the VIN By manufacturers to keep track of vehicles, for example, vehicles that need to be, or have been recalled for safety or reliability reasons However, VINs are cumbersome to use since there are many characters and their order and structure are not intuitive. When researching a particular vehicle, it is also time-consuming and tedious for a user of a web site to locate/recognize one or more VINs in an electronic file or document, and then type, or cut and paste, the VIN(s) into an input field. As a result, the process of searching for, recognizing/locating, transferring/copying/retyping, and requesting information, on one or more VINs, is prone to errors.

Therefore, there exists an unfulfilled need for a system and method for facilitating identification of one or more VINs in an electronic file or document. There is also an unfulfilled need for facilitating obtaining of information associated with a specific vehicle using VINs. In particular, there exists a need for such a system and method that facilitates identification of VINs in an electronically displayed file or document, and transferring of VINs into an input search field to expedite obtaining information regarding the specific vehicle.

SUMMARY OF THE INVENTION

One advantage of the present invention is in providing a system and method that simplifies and automates identification of VINs in an electronically displayed file or document.

Another advantage of the present invention is in providing such a system and method that facilitates transferring of VINs into an input search field of a vehicle history information system so that obtaining information regarding a specific vehicle from the vehicle history information system can be expedited.

Still another advantage of the present invention is in providing such a system and method that reduces the steps and the burden on the user related to locating/recognizing and entering a VIN into an electronically displayed input field of the vehicle history information system.

Yet another advantage of the present invention is in minimizing errors in VIN numbers which can result in retrieving of vehicle history information for a vehicle not of interest to the user.

In accordance with one aspect of the present invention, a vehicle history information system is provided for obtaining vehicle history information associated with a vehicle identification number (VIN). In one embodiment, the vehicle history information system includes a VIN identification module adapted to identify at least one VIN in an electronic file, a database having vehicle history records relating to vehicle history of one or more vehicles, and a vehicle history report module adapted to retrieve vehicle history records associated the at least one VIN identified by the VIN identification module.

The VIN identification module identifies the VIN by identifying a character string having 17 characters. In this regard, the VIN identification module is preferably adapted to perform at least one verification check to verify that the identified character string is a VIN. In one embodiment, the verification check includes determining whether the identified character string has letters and digits, determining whether the identified character string has at least one of letters "i", "o", or "q", and determining whether a character in a predetermined position of the identified character string is consistent with a VIN.

In accordance with another embodiment, the VIN identification module is further adapted to automatically submit the VIN identified to the vehicle history module. In another embodiment, the VIN identification module is adapted to copy the VIN identified into a search field or store a copy of the VIN identified.

A plurality of VINs may be identified in the electronic file. In such an embodiment, the VIN identification module may further be adapted to provide a listing of the plurality of VINs, to sort the VINs, and to delete any duplicate VINs. The VIN identification module is adapted to allow user selection of at least one of the plurality of VINs identified, and to submit the at least one user selected VIN to the vehicle history module.

The VIN identification module may be implemented in any appropriate manner, for example, as a software plug-in and/or an applet associated with a computer application. The computer application may be a browser application, an e-mail application, a word processing application, or any other appropriate computer application. In this regard, the VIN identification module in one implementation, may be embedded as part of a toolbar with an associated button or icon in the computer application.

In accordance with another aspect of the present invention, a method of obtaining vehicle history information associated with a vehicle identification number (VIN) is provided. In one embodiment, the method includes providing a database having vehicle history records relating to vehicle history of one or more vehicles, electronically parsing an electronic file to identify at least one VIN in the electronic file, and retrieving from the database, vehicle history records associated with the at least one VIN identified in the electronic file.

In another embodiment, electronically parsing the electronic file includes identifying a character string having 17 characters in the electronic file. In addition, the method further includes electronically performing at least one verification check to verify that the identified character string is, in fact, a VIN. The method may also include electronically copying the VIN identified into a search field, and electronically storing a copy of the at least one VIN identified.

A plurality of VINs may be identified in the electronic file. In such a case, the method may further include providing a listing of the plurality of VINs, where any duplicate VINs are deleted and the plurality of VINs are sorted. This allows electronically receiving a user selection of at least one of the plurality of VINs.

In accordance with yet another aspect of the present invention, a computer readable storage medium is provided, the medium including instructions for parsing an electronic file, and instructions for identifying at least one VIN in the electronic file. The medium further includes instructions for retrieving vehicle history records associated the VIN identified from a database having vehicle history records relating to vehicle history of one or more vehicles.

The medium preferably further includes instructions for identifying a character string having 17 characters in the electronic file, and instructions for performing at least one verification check to verify that the identified character string is a VIN. The medium also includes instructions for populating a search field with the VIN identified and/or instructions for storing a copy of the VIN identified.

A plurality of VINs may be retrieved from the electronic file. In this regard, the storage medium may further include instructions for listing of the plurality of VINs, for deleting any duplicate VINs, for sorting the plurality of VINs, and for receiving a user selection of at least one of the plurality of VINs. In accordance with still anther aspect of the present invention, a computer executable vehicle history number (VIN) identification module is provided which is adapted to identify at least one VIN in an electronic file. The module is adapted to identify a VIN by identifying a character string having 17 characters, and performing at least one verification check to verify that said identified character string is a VIN. Yet another aspect of the present invention is in providing a method of identifying at least one vehicle identification number (VIN) in an electronic file including electronically parsing an electronic file to identify a character string in said electronic file having 17 characters, and performing at least one verification check to verify that said identified character string is a VIN.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

As described in detail below, the present invention provides a system and method for allowing a user to easily submit one or more VINs to a vehicle history information system. In this regard, one preferred embodiment described in detail below allows VIN to be inputted into an input field without requiring the user to search for, and transfer, a VIN.

Figure 1:
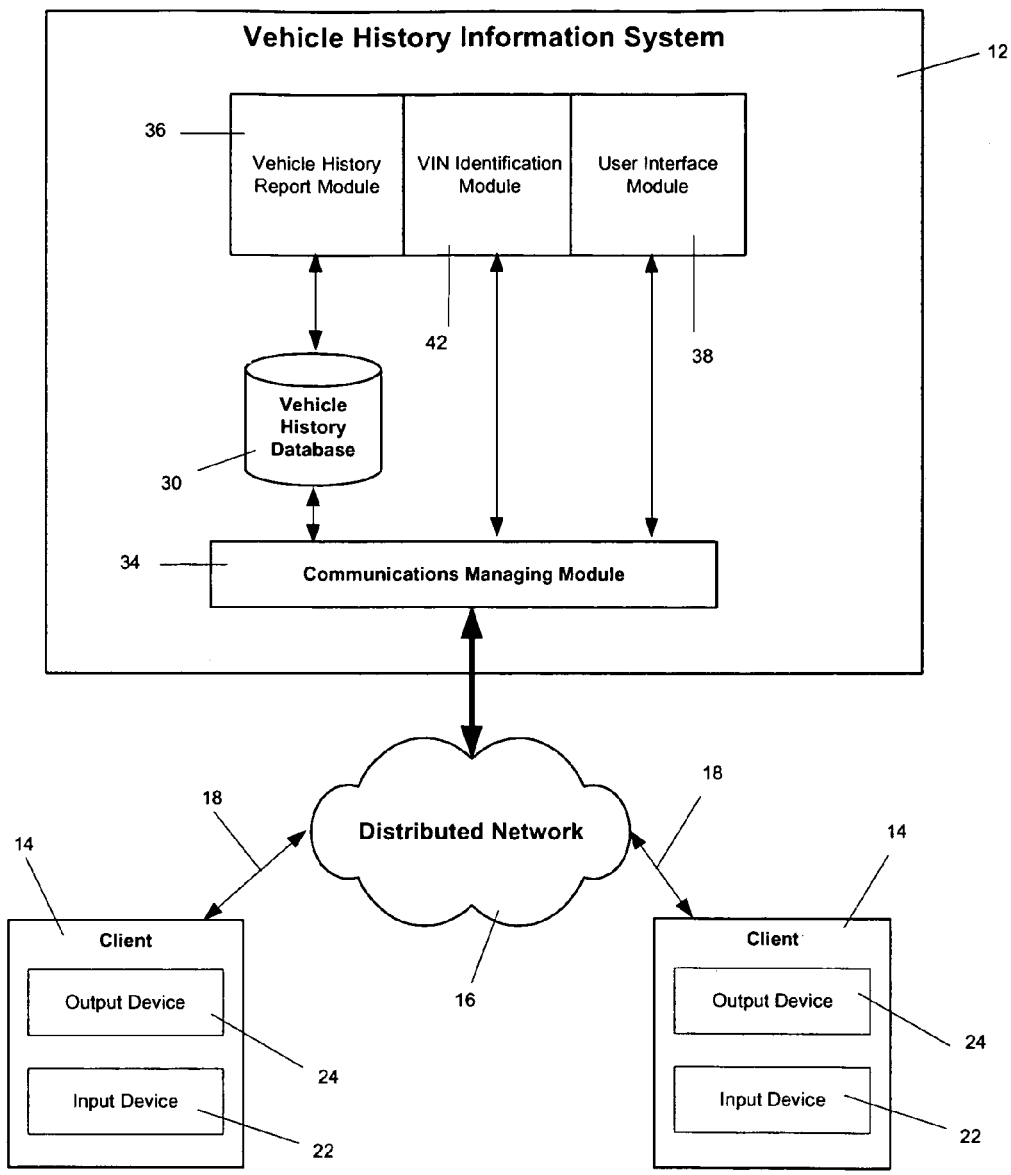
FIG. 1 is a schematic illustration vehicle history information system in accordance with one embodiment of the present invention.

Referring to the drawings, FIG. 1 shows a schematic illustration of a vehicle history information system 12 in accordance with one example embodiment of the present invention. Specifically, vehicle history information system 12 is computer implemented, and is adapted to exchange data with a plurality of clients 14 through data transmission across a distributed network 16, e.g. Internet. Clients 14 represent individual consumers and vehicle dealers accessing vehicle history information system 12 to obtain vehicle history information about a particular vehicle.

Distributed network 16 to which vehicle history information system 12 and clients 14 are connected may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, clients 14 may be connected to distributed network 16 by any conventional communication links 18, including via hardwire and/or in a wireless manner.

Generally, vehicle history information system 12 may be implemented with any type of appropriate hardware and software, with portions residing in the form of computer readable storage medium having executable instructions, and computer architecture. In this regard, the vehicle history information system 12 may be implemented using a server, personal computer, a portable computer, a thin client, etc. or any combination of such devices. Vehicle history information system 12 may be a single device at a single location as shown, or multiple devices at a single, or multiple locations that are connected together using any appropriate communication protocols over any communication medium such as electric cable, fiber optic cable, any other cable, or in a wireless manner using radio frequency, infrared, or other technologies.

FIG. 1 also illustrates an example implementation of clients 14. Clients 14 may be any appropriate devices for accessing vehicle history information system 12 such as a personal computer, a portable computer, a thin client, a handheld device such as a mobile phone or PDA, and the like. Clients 14 include input device 22 and output device 24 which allow the users of clients 14 to provide information to, and receive information from, vehicle history information system 12 via distributed network 16. In this regard, input device 22 may include a keyboard, mouse, etc. as well as data input devices such as memory devices based on magnetic, optical and/or solid state technologies including disc drives, CD/DVD drives, flash memory, etc. Output device 24 may include a monitor screen, printer, etc. that allow the users of clients 14 to obtain the vehicle history information from vehicle history information system 12 as described in further detail below.

In the preferred embodiment of the present invention, vehicle history information system 12 includes vehicle history report module 36, VIN identification module 42, and user interface module 38, the functions of each module being further described hereinbelow. Vehicle history information system 12 also includes vehicle history database 30 for storing vehicle history records associated with one or more vehicles. These modules and vehicle history database 30 are connected to communications managing module 34 for effective data communication between vehicle history information system 12 and distributed network 16. In particular, communications managing module 34 is adapted to manage communications and interactions between vehicle history information system 12 and its various components, and between the vehicle history information system and the various clients 14 via the distributed network 16.

Vehicle history information system 12 in accordance with the embodiment of the present invention is illustrated and discussed as having various modules which perform particular functions. It should be understood that these modules are merely schematically illustrated based on their function for clarity purposes, and do not necessarily represent specific hardware or software. In this regard, these modules and other components may be hardware and/or software implemented to substantially perform their particular functions explained herein. The various functions of the different components can be combined or segregated as hardware and/or software modules in any manner, and can be used separately, or in combination. Thus, the present invention as schematically embodied in FIG. 1 should not be construed to limit vehicle history information system 12 of the present invention, but be understood to merely be a schematic example.

Vehicle history database 30 contains a plurality of vehicle history records, each of which are related to a particular vehicle. Each vehicle history records are arranged, organized, indexed and/or retrievable based on the unique vehicle identification number (VIN) of the particular vehicle. As explained previously, each vehicle sold within the United States and most foreign countries has a unique VIN which is identified on nearly every vehicle title issued and physically identified on the respective vehicle. When a vehicle history report is requested using the vehicle history information system 12, all vehicle history records indexed by the same VIN are selected and retrieved. The VIN is the key to identifying and tracing the public record of each vehicle, and to associating different vehicle data collected from a variety of sources with the correct particular vehicle. Thus, as used herein, the phrase "particular vehicle" refers to only one physical vehicle associated with a single VIN and does not refer to general model level information or categories of vehicles, for example, relating to a particular make, model and/or year.

Vehicle history database 30 may be any conventional database capable of effectively storing collections of vehicle history records in an organized, accessible manner, to permit efficient easy access to desired vehicle history records associated with a particular VIN, using appropriate database management system software. The information stored in vehicle history database 30 as vehicle history records may include, for example, the VIN (which indicates make, model and year); accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information; sale information such as sale or offer for sale by an auction or a dealer; and any other information relevant to the vehicle's history. This information is preferably used to create corresponding vehicle history reports associated with a particular VIN for retrieval, processing and/or display in the manner described below.

In the preferred embodiment, vehicle history information system 12 includes appropriate hardware and software for implementing the various modules necessary to perform the functions described herein, in particular, analyzing the vehicle information regarding a particular vehicle, and providing the results of the analysis to the user of vehicle history information system 12, for example, in a vehicle history report. In this regard, vehicle history information system 12 may be implemented as a general purpose computing device with a central processing unit (CPU) or processor. The software for operating vehicle history information system 12 and of the various modules may reside in a computer readable storage medium in the form of encoded executable instructions for operating the system and performing the functionalities and process steps described herein.

Vehicle history report module 36 functions to access vehicle history database 30, and retrieve the appropriate vehicle history records associated with a particular vehicle being analyzed by vehicle history information system 12 as identified by a VIN. Thus, vehicle history report module 36 includes the appropriate software necessary to select the appropriate vehicle history records from vehicle history database 30 based on a particular request, i.e. VIN. Vehicle history report module 36 may further be adapted to arrange and organize the vehicle history records and information in a manner appropriate for further data processing, analysis and/or display. In this regard, vehicle history report module 36 is further adapted to generate a text listing of the vehicle history records in a vehicle history report that can be displayed to the user via the user interface module 38.

The user interface module 38 of the vehicle history information system 12 is adapted to generate a user interface for delivering the information provided by the vehicle history report module 36 to the output device 24 of client 14 requesting the information, and to allow the user to request such information through client 14. In particular, the user interface module 38 of the vehicle history information system 12 is implemented to allow the user to request vehicle history information associated with a particular vehicle, for example, by providing a VIN of the particular vehicle the user desires information. In this regard, user interface module 38 may be implemented with an input search field or other user interfacing features to allow providing of a VIN which identifies the particular vehicle for which vehicle history information is desired to the vehicle history information system 12.

The input search field may be implemented in any appropriate manner. For example, the input search field may be provided on a used vehicle search document in which a plurality of used vehicles are listed for consideration by a prospective buyer. The input search field may be also provided on a vehicle information search document that displays various information regarding a particular vehicle. In addition, the input search field may be implemented in a pop-up window which is launched upon selection of a button on a navigational tool bar.

In accordance with the illustrated embodiment, vehicle history information system 12 also includes VIN identification module 42 which operates in conjunction with user interface module 38 to provide a tool for easily identifying VINs in an electronically displayed file, and submitting the identified VIN to the vehicle history report module 36 for data retrieval and analysis. As explained in detail below, VIN identification module 42 automatically searches the electronically displayed file, for example, web page, email or word processing file, for one or more VINs. The identified VINs are verified as being VINs and the search field is populated with the one or more VINs identified. Thus, VIN identification module 42 substantially eliminates the need for users to identify and type, or cut and paste, the VIN from an electronically displayed file into the search field of the user interface module 38.

Figure 2:
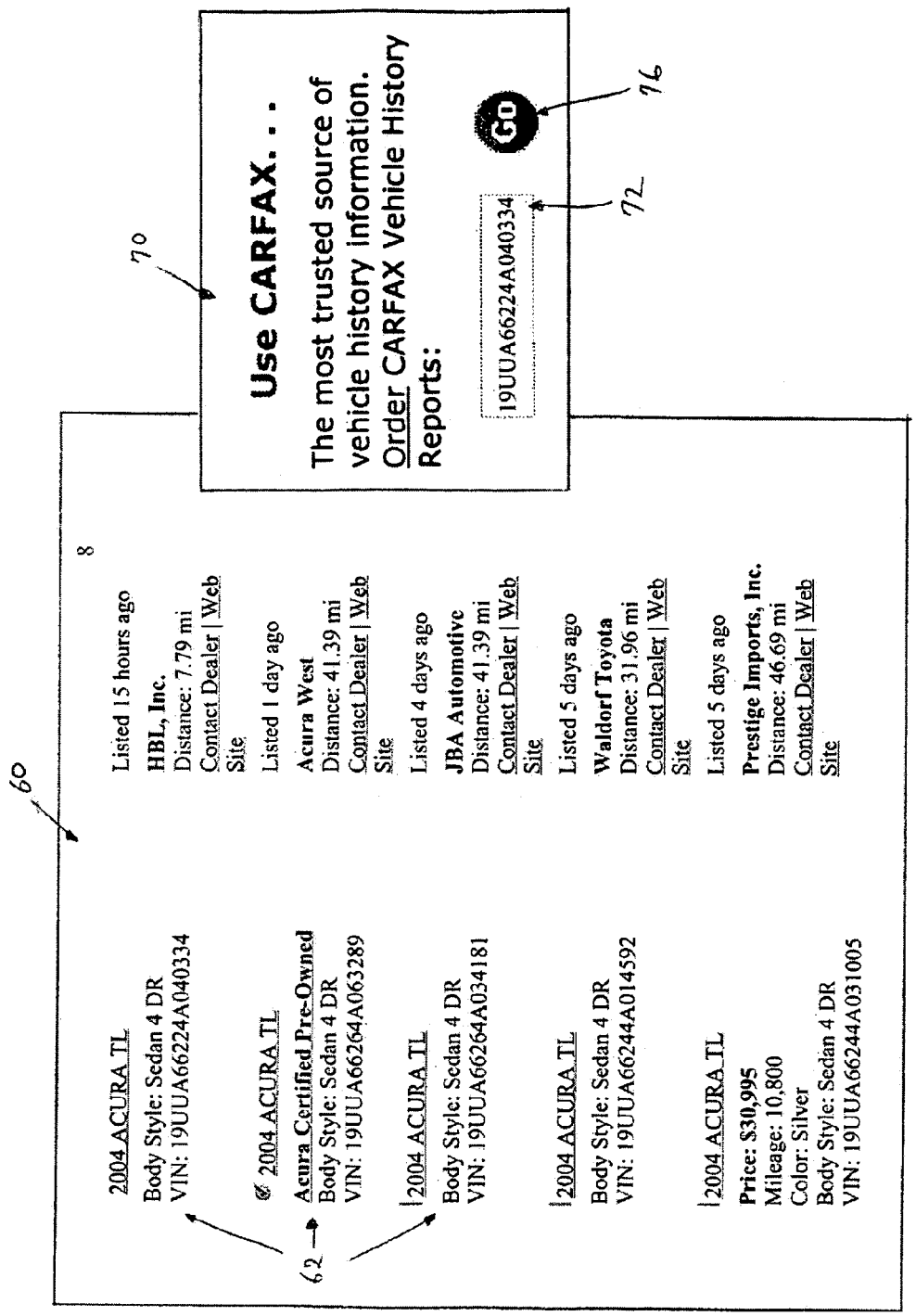
FIG. 2 is an example of an electronically displayed file/document in which a window having a search field for entry of a VIN is generated by the user interface module 38.

FIG. 2 illustrates an example electronically displayed file 60 that may be displayed by output device 24 for the user of client 18. As can be seen, the electronically displayed file 60 of the illustrated example is listing a plurality of used vehicles 62 for sale. Such a listing may be provided by a database or a webpage of an on-line vehicle reseller or on-line vehicle listing service such as www.autotrader.com, www.cars.com, etc. The illustrated electronically displayed file 60 of FIG. 2 was retrieved from an on-line vehicle listing service, and is a result of a search conducted for a 2004 Acura TL. The electronically displayed file 60 identifies the make and model of the vehicle, the body style, and on the right column, the identity of the seller, and the distance of the seller from a user inputted location. Of course, in other examples, additional information may be provided, including the mileage, condition, and price of the vehicle, etc. In addition to the noted various information regarding the vehicles 62, VINs of the corresponding vehicles are also provided for each of the vehicles 62 listed.

In accordance with the illustrated implementation of the present invention, FIG. 2 further illustrates a window 70 that is generated by the user interface module 38 described above relative to FIG. 1. As shown, window 70 overlays the electronically displayed file 60. The window 70 may be generated automatically, for example, as a pop up window which is associated with the displayed file 60, or be launched by the user when a button on a toolbar or the like is selected. The window 70 includes a search field 72 for displaying a VIN therein.

In accordance with the present invention, the VIN identification module 42 analyzes the electronically displayed file 60 to identify VINs in the manner described in further detail below, and populates search field 72 with the identified VIN. Thus, in the illustrated example implementation shown in FIG. 2, VIN 19UUA66224A040334 which is the first VIN in the electronically displayed file 60 is identified by the VIN identification module 42, and copied into the search field 72 of the window 70 generated by the user interface module 38. The user can then click on, or otherwise select, the button 76 with "GO" in the window 70 to submit the VIN in the search field 72 to the vehicle history report module 36 so that vehicle history records associated with the submitted VIN can be retrieved from the vehicle history database 30 and analyzed. The analyzed vehicle history records can then be provided to the output device 24 of client 14 as a vehicle history report.

Of course, the implementation of FIG. 2 is merely provided as an example, and the present invention may be implemented in any appropriate manner, for example, providing a search window in a tool bar, etc. In addition, the present invention may be implemented so as to provide a listing of the VINs of the electronically displayed file 60 within the window 70 so that the user can select the desired VIN to be submitted to the VIN identification module 42. Alternatively, the invention may be implemented to automatically render all of the identified VINs of the electronically displayed file 60 as hyperlinks so that the user can select the desired VIN directly on the electronically displayed file 60 for submission to the vehicles history report module 36.

The operation of an example VIN identification module 42 shown in FIG. 1 is described in further detail below with reference to FIG. 3 which illustrates a flow diagram 100. The flow diagram illustrates the operation of a VIN identification module 42 in accordance with one implementation of the present invention. As shown, user initiates a VIN search in step 102. For example, the VIN identification module 42 may be remotely initiated by user of client 18 through the input device 22, or be initiated automatically by the VIN identification module 42 upon generation of an electronically displayable file such as that shown in FIG. 2. Once initiated, VIN identification module 42 searches the electronically displayable file/document that is displayed in output device 24 of client 18 for a string of 17 characters as indicated in step 104.

Once a string of 17 characters is identified, VIN identification module 42 performs a series of verification checks to verify that the identified string is, in fact, a VIN. In accordance with one embodiment, the series of verification checks includes determining whether the string includes both letters and digits in step 106 as a VIN consist of both letters and digits. If both letters and digits are not present, VIN identification module 42 reverts back to step 104 to identify another string of 17 characters in the electronically displayable file/document for processing.

If both letters and digits are present, VIN identification module 42 performs another verification check to determine whether there are letters "i", "0", or "q" in the character string in step 106. If such letters are present, this means that the string of 17 characters is not a VIN and the VIN identification module 42 reverts back to step 104 to identify another string of 17 characters for processing. If letters "i", "o", or "q" are not present in the character string, VIN identification module 42 checks to see if various characters in their respective positions in the character string is consistent with a VIN as indicated in step 110 of flow diagram 100. For instance, the VIN identification module 42 may be implemented to check to see if the position 1 of the character string is consistent with known characters for countries of origin (i.e., 1=United States; J=Japan, etc.). The VIN identification module 42 may also be implemented to check to see if the position 2 of the character string is consistent with known characters for manufacturers (i.e., G=GM; B=BMW; N=Nissan, etc.).

The above noted information regarding acceptable characters for respective positions of the character string may be stored in the VIN identification module 42, or be provided elsewhere in the vehicle history information system 12. In this regard, look up tables or other data structures may be used to retain such information in the vehicle history information system 12. Of course, whereas the VIN identification module 42 is described above as checking only the first two characters in the first two positions of the character string, it should be evident that in other embodiments, additional positions may also be checked. If any of the characters in their respective positions are inconsistent thereby indicating that the character string is not a VIN, the VIN identification module 42 reverts back to step 104 to identify another string of 17 characters for processing.

If the characters in certain positions are consistent with a VIN in step 110, the VIN identification module 42 proceeds to step 112 to determine whether the identified VIN was previously identified and stored, for example, in a memory of VIN identification module 42. If the VIN has been already stored, VIN identification module 42 reverts back to step 104 to identify another string of 17 characters for processing. If the VIN has not been stored, it is stored by VIN identification module 42 in step 114 and a determination is made as to whether there are any other 17 character strings. If there are other string of 17 characters, VIN identification module 42 reverts back to step 104 to repeat the above noted steps.

If there are no other string of 17 characters, a determination is made in step 116 as to whether only one VIN was found in the electronically displayable file/document being analyzed. If only one VIN was found, VIN identification module 42 populates the VIN search field with the VIN identified and stored in step 118. If more than one VIN was found and stored by VIN identification module, VIN identification module 42 deletes any duplicate VINs in step 120, and further sorts the VINs remaining in step 122. These remaining VINs are provided to user interface module 38 in step 124 for display on output device 24 of client 18 so that the user can select the desired VIN for populating the search field in step 126. After the search field is populated, the user can submit the VIN to vehicle history report module 36 to request the vehicle history records associated with the selected VIN, i.e. a particular vehicle, to be analyzed and presented, for example, as a vehicle history report.

Figure 3:
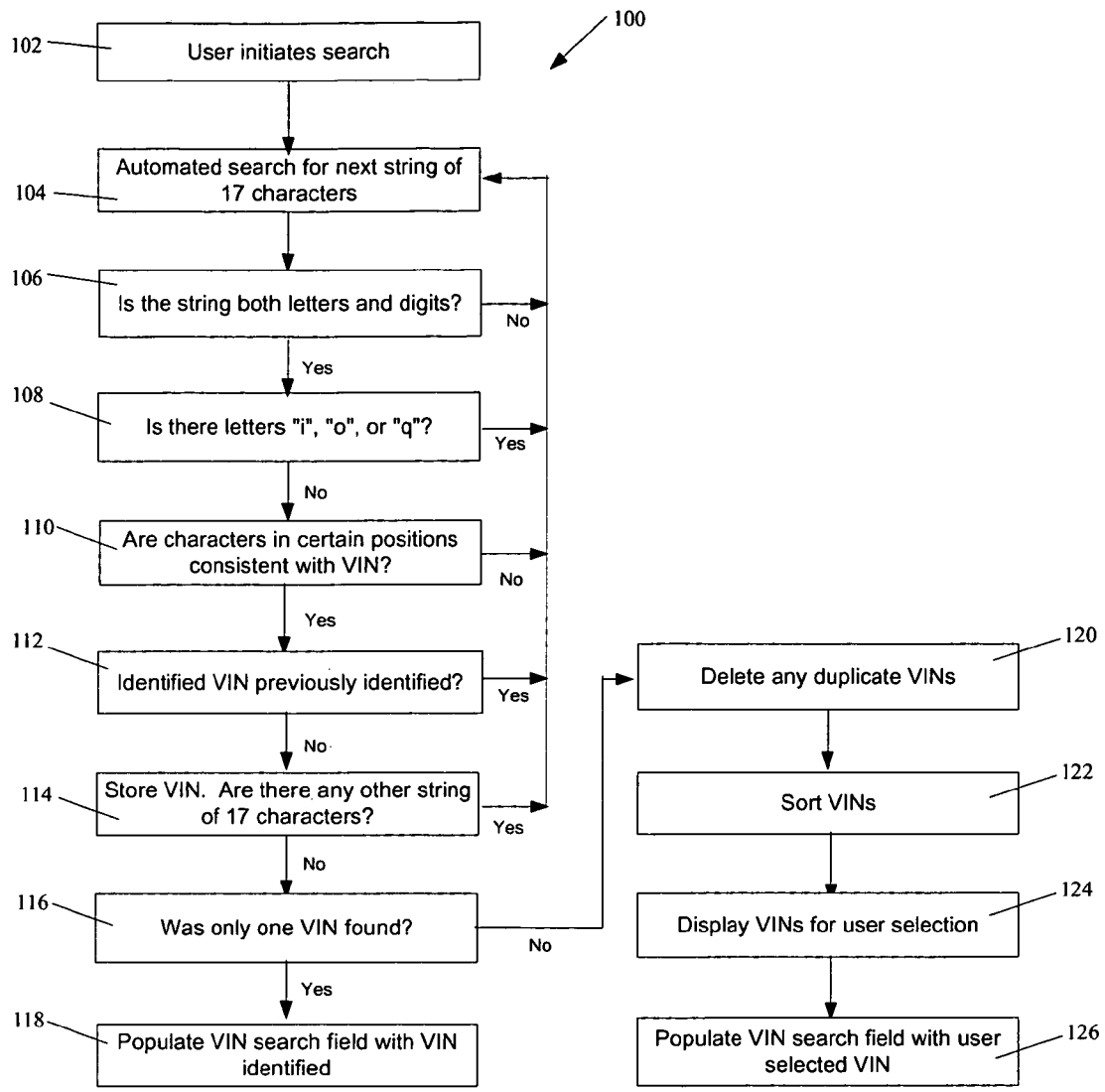
FIG. 3 is a flow diagram illustrating the operation of a VIN identification module in accordance with one embodiment of the present invention.

Of course, it should be noted that the above described method as shown in flow diagram 100 of FIG. 3 is merely one example embodiment and the present invention is not limited thereto. For instance, in other embodiments, not all of the verification checks as described in steps 106 to 110 need be conducted. Alternatively, different verification checks may be performed to ensure that a string of 17 characters are, in fact, a VIN. In addition, as noted above, VIN identification module 42 may be implemented so that upon user's selection of a particular VIN from a listing of identified VIN numbers, VIN identification module 42 automatically provides the selected VIN to vehicle history report module 36 for analysis without populating a search field and requiring the user to submit the selected VIN to vehicle history report module 36. In yet another implementation, in instances where a plurality of VINs are identified on an electronically displayed file, the identified VIN numbers may be rendered as hyperlinks to allow selection of the desired VIN by the user. Alternatively, batch processing can be used to allow the user to select a plurality of VINs to be submitted to vehicle history report module 36 for processing.

Correspondingly, when VIN identification module 42 is prompted or activated by the user, or automatically activated, VIN identification module 42 searches the electronic file, for example, a web page, email or word processing document, for one or more VINs. Thus, as explained above, vehicle history information system 12 in accordance with the present invention substantially eliminates the need for users to identify and type, or cut and paste, the VIN into a search field.

The user interface module 38 and/or VIN identification module 42 may advantageously be implemented as a software plug-in or applet that is associated with an application, for example, a browser application, email program and/or any word processing application. Preferably, the user interface module 38 is embedded as part of a toolbar with an associated button or icon, which upon selection, initiates the module. The toolbar may be customized for the particular user or provider, such as a toolbar customized by CARFAX, Inc.

In the above regard, user interface module 38 and/or VIN identification module 42 and associated toolbar may be implemented as software which users can, for example, download from a vehicle history database provider's website, e.g. www.carfax.com, for storage in the memory of the client 14 which may be a personal computer, portable computer, thin client, personal digital assistant, etc. Once downloaded and installed, this toolbar may be located at the top, bottom or side of the user's window, i.e. browser window, to allow users to easily identify VINs from an electronic file, and obtain vehicle history reports or other information from vehicle history information system 12 when their browser window is opened. In such a web browser application, the present invention may be implemented to launch the web browser, and access the web pages of vehicle history information system 12 through distributed network 16, for example, by being provided with a URL search string, including the VIN, to the vehicle history information system 12 so that a vehicle history report for the particular vehicle can be generated.

The above described implementations of vehicle history information system 12, and in particular, the user interface module 38 and the VIN identification module 42, allows the present invention to be advantageously used in a variety of situations. For example, vehicle history information system 12 may be used by an automobile dealer to run one or more vehicle history reports while working on the dealer's web-based dealership management system. A consumer may use vehicle history information system 12 while shopping for a used car on a web site which lists a plurality of used vehicles for sale. When the consumer finds a used vehicle of interest on a given webpage, the consumer can activate the user interface module 38 and the VIN identification module 42, for example, by clicking on an icon in the browser's toolbar. The VIN identification module 42 then operates in the manner described above to identify VINs on the displayed web page, and populates a search field provided by the user interface module 38 to thereby allow the user to easily submit the identified VIN to vehicle history report module 36 for further processing.

Of course, the present invention is not limited to the webpage application described. The present invention can also be used to identify VIN and populate a search field with the identified VIN in an email or word processing document.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A vehicle history information system for obtaining vehicle history information associated with a vehicle identification number (VIN) comprising:
   a VIN identification module adapted to automatically electronically search an electronically displayable file, containing a plurality of vehicle information, to identify at least one VIN in the electronically displayable file;
   a database having vehicle history records relating to a vehicle history of one or more vehicles; and
   a vehicle history report module adapted to retrieve vehicle history records associated with said at least one VIN identified by said VIN identification module.

2. The system of claim 1, wherein said VIN identification module identifies said at least one VIN by identifying a character string having 17 characters.

3. The system of claim 2, wherein said VIN identification module is further adapted to perform at least one verification check to verify that said identified character string is a VIN.

4. The system of claim 3, wherein said at least one verification check includes determining whether said identified character string has letters and digits.

5. The system of claim 3, wherein said at least one verification check includes determining whether a character in a predetermined position of said identified character string is consistent with a VIN.

6. The system of claim 1, wherein said VIN identification module is further adapted to automatically submit said at least one VIN identified to said vehicle history module.

7. The system of claim 1, wherein said VIN identification module is further adapted to copy said at least one VIN identified into a search field.

8. The system of claim 1, wherein said VIN identification module is further adapted to store a copy of said at least one VIN identified.

9. The system of claim 1, wherein said at least one VIN identified is a plurality of VINs, and said VIN identification module is further adapted to provide a listing of said plurality of VINs.

10. The system of claim 9, wherein said VIN identification module is further adapted to allow user selection of at least one of said plurality of VINs identified.

11. The system of claim 10, wherein said VIN identification module is further adapted to automatically submit said at least one user selected VIN to said vehicle history module.

12. The system of claim 1, wherein said VIN identification module is at least one of a software plug-in and an applet associated with a computer application.

13. The system of claim 12, wherein said computer application is at least one of a browser application, an e-mail application and a word processing application.

14. The system of claim 12, wherein said VIN identification module is embedded as part of a toolbar with an associated button or icon in said computer application.

15. A method of obtaining vehicle history information associated with a vehicle identification number (VIN) comprising:
   providing a database having vehicle history records relating to vehicle history of one or more vehicles;
   automatically electronically parsing an electronically displayable file, containing a plurality of vehicle information, to identify at least one VIN in said electronically displayable file; and
   retrieving from said database, vehicle history records associated with said at least one VIN identified in said electronic file.

16. The method of claim 15, wherein said electronically parsing includes identifying a character string having 17 characters in said electronic file.

17. The method of claim 16, further including electronically performing at least one verification check to verify that said identified character string is a VIN.

18. The method of claim 17, wherein said at least one verification check includes determining whether said identified character string has letters and digits.

19. The method of claim 17, wherein said at least one verification check includes determining whether a character in a predetermined position of said identified character string is consistent with a VIN.

20. The method of claim 15, further including electronically copying said at least one VIN identified into a search field.

21. The method of claim 15, further including electronically storing a copy of said at least one VIN identified.

22. The method of claim 15, wherein said at least one VIN is a plurality of VINs, said method further including providing a listing of said plurality of VINs.

23. The method of claim 22, further including electronically receiving a user selection of at least one of said plurality of VINs.

24. A computer readable storage medium comprising:
   instructions for automatically electronically parsing an electronically displayable file containing a plurality of vehicle information; and
   instructions for identifying at least one VIN in said electronically displayable file while parsing said electronically displayable file by identifying a character string having 17 characters in said electronically displayable file.

25. The storage medium of claim 24, further including instructions for retrieving vehicle history records associated with said at least one VIN identified from a database having vehicle history records relating to vehicle history of one or more vehicles.

26. The storage medium of claim 25, wherein said computer application is at least one of a browser application, an e-mail application and a word processing application.

27. The storage medium of claim 24, further including instructions for performing at least one verification check to verify that said identified character string is a VIN.

28. The storage medium of claim 27, wherein said at least one verification check includes determining whether said identified character string includes letters and digits.

29. The storage medium of claim 27, wherein said at least one verification check includes determining whether a character in a predetermined position of said identified character string is consistent with a VIN.

30. The storage medium of claim 24, further including instructions for populating a search field with said at least one VIN identified.

31. The storage medium of claim 24, further including instructions for storing a copy of said at least one VIN identified.

32. The storage medium of claim 24, wherein said at least one VIN is a plurality of VINs, said storage medium further including instructions for listing of said plurality of VINs.

33. The storage medium of claim 24, further including instructions for receiving a user selection of at least one of said plurality of VINs.

34. A computer executable vehicle identification number (VIN) identification module adapted to automatically electronically search an electronically displayable file, containing a plurality of vehicle information, and identify at least one VIN in the electronically displayable file by identifying a character string having 17 characters, and performing at least one verification check to verify that said identified character string is a VIN.

35. The module of claim 34, wherein said at least one verification check includes determining whether said identified character string has letters and digits.

36. The module of claim 34, wherein said at least one verification check includes determining whether a character in a predetermined position of said identified character string is consistent with a VIN.

37. The module of claim 34, wherein said module is further adapted to copy said at least one VIN identified into a search field.

38. The module of claim 34, wherein said module is at least one of a software plug-in and an applet associated with a computer application.

39. The module of claim 38, wherein said computer application is at least one of a browser application, an e-mail application and a word processing application.

40. A method of identifying at least one vehicle identification number (VIN) in an electronic file comprising:
automatically electronically parsing an electronically displayable file, containing a plurality of vehicle information to identify a character string in said electronically displayable file having 17 characters; and
performing at least one verification check to verify that said identified character string is a VIN.

41. The method of claim 40, wherein said at least one verification check includes determining whether said identified character string has letters and digits.

42. The method of claim 40, wherein said at least one verification check includes determining whether a character in a predetermined position of said identified character string is consistent with a VIN.

43. A vehicle history information system for obtaining vehicle history information associated with a vehicle identification number (VIN) comprising:
a VIN identification module adapted to identify a plurality of VINs in an electronic file, said VIN identification module further adapted to provide a listing of said plurality of VINs and to delete any duplicate VINs;
a database having vehicle history records relating to a vehicle history of one or more vehicles; and
a vehicle history report module adapted to retrieve vehicle history records associated with said plurality of VINs identified by said VIN identification module.

44. A vehicle history information system for obtaining vehicle history information associated with a vehicle identification number (VIN) comprising:
a VIN identification module adapted to identify a plurality of VINs in an electronic file, said VIN identification module further adapted to provide a listing of said plurality of VINs and to sort said plurality of VINs;
a database having vehicle history records relating to a vehicle history of one or more vehicles; and
a vehicle history report module adapted to retrieve vehicle history records associated with said plurality of VINs identified by said VIN identification module.

45. A method of obtaining vehicle history information associated with a vehicle identification number (VIN) comprising:
providing a database having vehicle history records relating to vehicle history of one or more vehicles;
electronically parsing an electronic file to identify a plurality of VINs in said electronic file;
providing a listing of said plurality of VINs and deleting any duplicate VINs; and
retrieving from said database, vehicle history records associated with said plurality VINs identified in said electronic file.

46. A method of obtaining vehicle history information associated with a vehicle identification number (VIN) comprising:
providing a database having vehicle history records relating to vehicle history of one or more vehicles;
electronically parsing an electronic file to identify a plurality of VINs in said electronic file;
providing a listing of said plurality of VINs and sorting said plurality of VINs; and
retrieving from said database, vehicle history records associated with said plurality of VINs identified in said electronic file.

47. A computer readable storage medium comprising:
instructions for parsing an electronic file;
instructions for identifying a plurality of VINs in said electronic file;
instructions for listing of said plurality of VINs; and
instructions for deleting any duplicate VINs.

48. A computer readable storage medium comprising:
instructions for parsing an electronic file;
instructions for identifying a plurality of VINs in said electronic file;
instructions for listing of said plurality of VINs; and
instructions for sorting said plurality of VINs.

* * * * *